Patented June 9, 1936

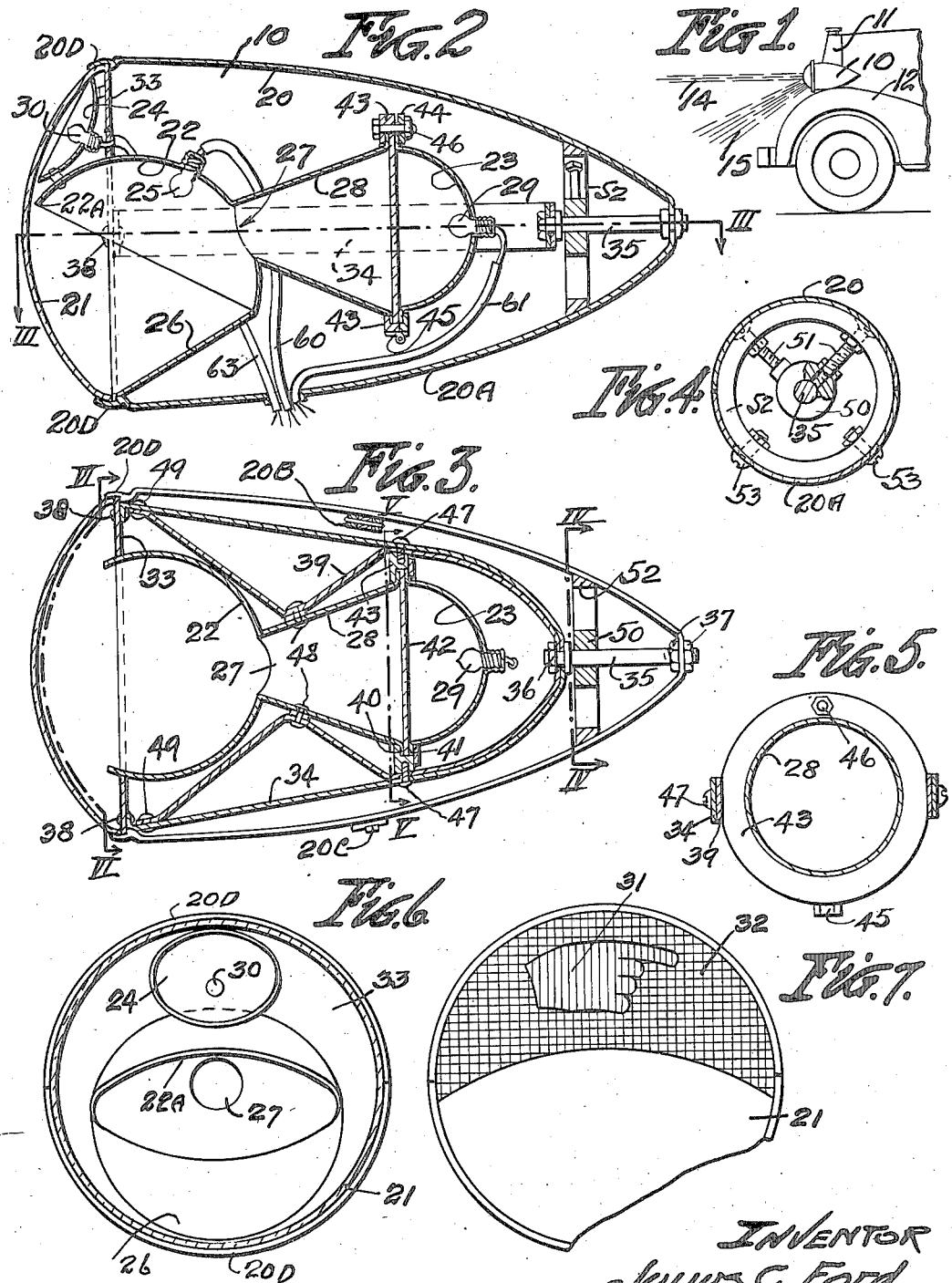

2,043,289

UNITED STATES PATENT OFFICE 2,043,289

AUTOMOBILE HEADLIGHT

Julius C. Ford, Memphis, Tenn.

Application August 9, 1935, Serial No. 35,440

4 Claims. (Cl. 240—41.35)

This invention relates to improvements in automobile head lights and has particular reference to a head light construction in which a beam of light is thrown directly forward and at the same time is shielded to prevent the glare therefrom reaching the eyes of an approaching motorist, and in addition a second light beam is thrown principally downward to provide additional illumination immediately in front of the automobile.

The present application is in part a continuation of my co-pending application Serial No. 19,968, filed May 6, 1935, for Automobile lighting and signal system.

The objects of the invention are:

To improve the design and construction of the headlights of an automobile in order that they may be available without glare, for country and/or rapid driving and may also be available for the ordinary range of speeds; to provide in such construction, means whereby various parts of the device may be made accessible for adjustment and replacement of parts; and to provide means for accomplishing such adjustments.

The means by which the foregoing and other objects are accomplished and the manner of their accomplishment will readily be understood from the following specification on reference to the accompanying drawing in which,—

Fig. 1 is a side elevation of a fragmentary portion of the forward end of an automobile particularly showing a head light thereon and the general direction of the rays thrown out by such head light.

Fig. 2 is a sectional side elevation on a much larger scale of the head light.

Fig. 3 is a sectional plan taken as on the line III—III of Fig. 2, looking down.

Figs. 4 and 5 are transverse sections taken respectively on the lines IV—IV and V—V of Fig. 3.

Fig. 6 is a sectional front elevation taken on the line VI—VI of Fig. 3, and

Fig. 7 is a front elevation, a portion of one side being broken away.

Referring now to the drawing in which the various parts are indicated by numerals, 10 is a head light of an automobile which is shown mounted in usual manner at the forward end of the automobile, adjacent the radiator 11 and the front fender 12, the detail of such mounting, being usual and well-known, not being shown. 14 are long distance or spot light rays for illumination of the roadway well in advance of the automobile and 15 are more diffused rays cast forwardly and downwardly for illumination of the roadway closely in front of the automobile. The head lights 10 include an elongated casing of generally parabolic form preferably divided along a horizontal plane into upper and lower halves 20, 20A which are hinged together as by hinges 20B at one side and latched together at the opposite side as by a latch 20C. The hinge and latch detail are immaterial and are not shown. At the forward end of the casing is a lense 21, which is preferably held in place by the arcuately curved forward ends 20D of the casing halves.

Within the enclosure thus formed are preferably three reflectors 22, 23 and 24. The reflector 22 is so mounted that the rays therefrom are directed more downwardly than forwardly. Mounted in this reflector is a light bulb 25, this bulb being so mounted that objects directly ahead are shielded from the direct rays thereof by the forward edge 22A of the reflector. 26 is a lower shield preferably unpolished, completing the inclosure for the bulb 25. Where the horizontal axis of the casing 20, 20A intersects the reflector 22, there is an opening 27 through such reflector from which a conical tube 28 enlarges rearwardly to the reflector 23. 29 is a spot light bulb positioned on the axial center of the reflector 23, rays from this bulb being constrained to pass forwardly through the opening 27 in substantially a horizontal pencil, as, indicated by the rays 14 in Fig. 1, whereby to illuminate the roadway far in advance of the car. The forward edge 22A of the reflector 22 acts also as a shield to prevent the rays from the bulb 29 spreading upward and into the eyes of approaching motorists.

The reflector 24 is positioned above and forwardly of the reflector 22 and is provided with a bulb 30 for illumination of a front directional signal. As indicated in Fig. 7 by conventional lining for colors, a portion 31 of the lens 21 in front of the bulb 30 and the reflector 24, and of the general shape of a hand, is colored red, the lens immediately surrounding the hand 31 as indicated in 32, being painted black to more clearly outline the hand, the lower edge of the portion so colored black substantially conforming to the line of the forward edge 22A of the reflector 22. The hands for the head lights on the right and left hand head lights pointing respectively to the right and left and the illuminating bulbs therebehind being adapted for selective illumination in any usual or desired manner.

33 is a diaphragm at the forward end of the casing 20 which is apertured to receive the reflector 22 in the casing portion 20A and is entirely open in front of such reflector and casing portion, both preferably being secured to the diaphragm as by welding. 34 is a U-shaped strap member having its rear end secured to a bolt 35 by a nut 36, the opposite end of the bolt 35 being secured to the rear end of the casing 20 by nuts 37. The two legs of the U extend forward and are secured to the diaphragm 33 as by rivets 38. Lying within the U shaped member may be a second strap member 39, the rear portion of this strap member conforming to and lying against the inside of the U-shaped member 34 and being secured in common with such portion of the U shaped strap member to the bolt 35 by the nut 36. The larger end of the conical tube 28 is provided with an outwardly extending flange 40 and the peripheral edge of the reflector 23 is provided with a similar flange 41, these flanges being adapted to be contacted against the peripheral side edges of a disk or lens 42. 43 is an annular ring annularly grooved to receive the flanges 40, 41 and the lens 42 therebetween. 44 is a flat annular ring adapted to cooperate with the grooved annular ring 43 to clamp the flanges the grooved annular ring 43 to clamp the flanges and lens in place, the lower edges of the ring 43 and plate 44 are secured together as by a hinge 45 and the upper edges as by a bolt and nut 46. The inner strap 39 extends forward with the outer strap member 34 until it passes the ring 43 both strap members being secured to the ring 43 as by screws 47. Forwardly of the ring 43, the inner strap member may be bent inward and secured to the conical tube 28 as by rivets 48, and thence extends again outward and is secured to the strap member 34, adjacent the diaphragm 33, as by rivets 49. The forward end of the bolt 35, adjacent the rear end of the straps 34, 39, passes through a collar 50, this collar is adjustably supported as by screws 51 disposed approximately 90 40 degrees to each other, these screws extend through and are turnably mounted on an annular ring 52 which is secured to the lower half 20A of the outer casing as by screws 53. By turning the screws 51, to screw them into or unscrew them from the collar 50, the position of the collar may be adjusted both laterally and vertically, it being understood that the flexibility of the casing material is sufficient to allow such movement of the bolt and collar as is necessary for adjustment purposes.

60, 61, 63 are current cables leading respectively to the bulbs 25, 29 and 30. These cables lead in usual manner through switches to a usual source of energy which being well known, need not here be shown.

The head lights are mounted on the automobile in usual manner and wiring cables connected up to such switches and source of energy as may be available.

In such use under ordinary conditions both the spot light bulb 29 and the downwardly directed bulb 25 may be used together. Preferably however the switch control is such that either may be used alone at option.

Where the directional bulb 30 is installed, the circuit for such bulb must necessarily be so arranged that the bulb is only turned on when its use is desired. However the control of the circuits leading to these bulbs has no direct connection with the head light structure and need not here be shown or described.

At any time access may be had to the interior of the head light by releasing the latch 20C and turning the upper portion 20 of the casing about the hinges 20B. This action releases the upper half of the lens 21, of the diaphragm 33, and of the ring 52 and exposes the cable connections to the sockets of the bulbs 25 and 29 and, through the diaphragm 33, of the bulb 30. It also permits access to the screws 51 whereby the forward end of the bolt 35 may be shifted to adjust the bulb 29 both vertically and laterally. Should access be desired to the bulb 25 or 30, the lens 21 may be lifted from its seat in the arcuate forward edge of the casing and both bulbs be so exposed. Should access be desired to the bulb 29, the bolt and nut 46 may be loosened and the reflector 23 be turned backward and downward about the hinge 45 to permit such access. After these latter adjustments are made, the reflector 23 has been locked in place and the lens 21 replaced, the upper half 20 of the casing is closed and locked and the head light is again ready for use.

What I claim is:

1. An automobile head light including an open end casing of substantially parabolic shape disposed with the axis of the parabola in a horizontal position and the open end forward and a self contained lighting unit disposed within said casing; said unit comprising a diaphragm fitting the forward end of said casing, and having its lower portion apertured, a first reflector facing downwardly and forwardly disposed behind said diaphragm, having its forward edge projecting through said aperture and being secured to said diaphragm, a shield secured to said reflector behind said diaphragm and extending forwardly to a junction with said diaphragm around said aperture; said reflector having an opening on the horizontal axis of the casing, a conical tube secured to said reflector around, and enlarging rearwardly from said opening, a second reflector secured to the rear end of said tube; a third reflector disposed forwardly of said diaphragm and above said first reflector and secured to said diaphragm and said first reflector, a U shaped strap secured to said diaphragm, to said first reflector, and to said second reflector, a bolt securing said U shaped strap to the apex of said casing; means for adjusting the position of said bolt relative to the axis of said casing, and lighting bulbs one in each of said reflectors.

2. An automobile head light including an open end casing disposed with its axis in a horizontal position and said open end forward; and a self contained lighting unit disposed within said casing; said unit comprising a diaphragm fitting the forward end of said casing, and having its lower portion apertured, a first reflector, disposed behind said diaphragm, facing downwardly and forwardly through said aperture and secured to said diaphragm, a shield secured to the lower portion of said reflector behind said diaphragm and extending forwardly to a junction with said diaphragm around the lower portion of said aperture; said reflector having an opening substantially on the horizontal axis of the casing, a tube secured to said reflector around, and extending rearwardly from said opening, a second reflector secured to the rear end of said tube; bracing means secured to said diaphragm extending rearwardly along and secured to opposite sides of said first reflector and of said second reflector, means for securing the rear portion of said bracing means to said casing, and lighting bulbs one in each of said reflectors.

3. An automobile head light including an open end casing disposed with its axis in a horizontal position and said open end forward, a lens secured to and completing an enclosure for the forward end of said casing; and a self contained lighting unit disposed within said casing; said unit comprising a diaphragm fitting the forward end of said casing, and having its lower portion apertured, a first reflector disposed behind said diaphragm, facing downwardly and forwardly through said aperture and secured to said diaphragm, a shield secured to the lower portion of said reflector behind said diaphragm and extending forwardly to a junction with said diaphragm around the lower portion of said aperture; said reflector having an opening substantially on the horizontal axis of the casing, a tube secured to said reflector around, and extending rearwardly from said opening, a second reflector secured to the rear end of said tube; a third reflector disposed forwardly of said diaphragm above said aperture, and secured to said diaphragm, and lighting bulbs one in each of said reflectors.

4. An automobile head light including an open end casing disposed with its axis in a horizontal position and said open end forward, a lens secured to and completing an enclosure for the forward end of said casing; and a self contained lighting unit disposed within said casing; said unit comprising a diaphragm fitting the forward end of said casing, and having its lower portion apertured, a first reflector disposed behind said diaphragm, facing downwardly and forwardly through said aperture and secured to said diaphragm, a shield secured to the lower portion of said reflector behind said diaphragm and extending forwardly to a junction with said diaphragm around the lower portion of said aperture; said reflector having an opening substantially on the horizontal axis of the casing, a tube secured to said reflector around, and extending rearwardly from said opening, a second reflector secured to the rear end of said tube; means for adjusting the rear end of said lighting unit in a plane transverse to the axis of said casing, and lighting bulbs one in each of said reflectors.

JULIUS C. FORD.